(12) United States Patent
Dames et al.

(10) Patent No.: US 6,230,972 B1
(45) Date of Patent: May 15, 2001

(54) MAGNETIC READING DEVICES

(75) Inventors: Andrew Nicholas Dames, Cambridge; Michael David Crossfield, West Wickham; Alexander Wilson McKinnon, Grantchester, all of (GB)

(73) Assignee: Flying Null Limited, Cambridge (GB)

( * ) Notice: Subject to any disclaimer, the term of this patent is extended or adjusted under 35 U.S.C. 154(b) by 0 days.

(21) Appl. No.: 09/202,631

(22) PCT Filed: Jun. 19, 1997

(86) PCT No.: PCT/GB97/01662
  § 371 Date: May 24, 1999
  § 102(e) Date: May 24, 1999

(87) PCT Pub. No.: WO97/48990
  PCT Pub. Date: Dec. 24, 1997

(30) Foreign Application Priority Data

Jun. 19, 1996 (GB) .................................................. 9612831
Oct. 3, 1996 (GB) .................................................. 9620591

(51) Int. Cl.⁷ ........................................................ G06K 7/08
(52) U.S. Cl. ........................................ 235/449; 235/493
(58) Field of Search ................................. 235/449, 380, 235/493

(56) References Cited

U.S. PATENT DOCUMENTS

| | | |
|---|---|---|
| 3,919,704 | 11/1975 | Williams et al. . |
| 3,964,042 | 6/1976 | Garrott . |
| 4,906,925 | 3/1990 | Kiminkinen . |
| 5,397,985 | 3/1995 | Kennedy . |
| 5,594,229 | * 1/1997 | Hoshino et al. ...................... 235/449 |
| 5,979,774 | * 11/1999 | Urushibata .......................... 235/493 |

FOREIGN PATENT DOCUMENTS

| | | | |
|---|---|---|---|
| 3052425 | 6/1988 | (EP) . | |
| 0 713 195 A1 | 11/1994 | (EP) | ............................. G06K/19/06 |
| 8135866 | 7/1983 | (JP) . | |

* cited by examiner

*Primary Examiner*—Karl Frech
(74) *Attorney, Agent, or Firm*—Oppenheimer Wolff & Donnelly LLP

(57) ABSTRACT

A detector for sensing the presence of a magnetic tag having an axis of easy magnetization, which comprises (1) either (i) a magnet or (ii) a pair of magnets arranged in magnetic opposition, the magnet or magnets being disposed so as to define a spatial region through or across which the magnetic tag is, in use, passed, the disposition of the magnet(s) and the resultant magnetic field pattern being such as to cause a change in polarity of the magnetization of the magnetic tag in the course of its passage through a magnetic null within the spatial region; and (2) a receiver coil or coils positioned above and in proximity to one pole of the magnet (where a single magnet is employed), or positioned between the pair of magnets (where two magnets are employed) and arranged to detect magnetic dipole radiation emitted by a magnetic tag as it passes through the magnetic null with the easy axis of magnetization of the tag oriented in the direction of travel. The receiver coils are preferably constructed as an assembly of printed circuit boards whose conductive tracks are interconnected to form a three dimensional coil having windings in the various layers.

19 Claims, 5 Drawing Sheets

MAGNETIC READING DEVICES

This invention relates to magnetic sensing and reading devices and, more particularly, is concerned with detectors (or readers) for reading information stored in magnetic tags or elements.

In previous patent applications (GB 9506909.2 and PCT/GB96/00823—published as WO96/31790) we have described novel techniques for spatial magnetic interrogation based on exploiting the behaviour of magnetic materials as they pass through a region of space containing a magnetic null. In particular, our earlier applications describe how passive tags containing one or more magnetic elements can perform as remotely-readable data carriers, the number and spatial arrangement of the elements representing information.

WO96/31790 (published Oct. 10, 1996) defines a magnetic null as: "a point, line, plane or volume in space at or within which the component of the magnetic field in a given linear direction is zero"—see page 3 line 34 to page 4 line 2 of that document.

In our previous applications we described a number of possible system embodiments employing either permanent magnets or electromagnets to create the magnetic null. We also described some possible system implementations which were particularly appropriate for tags employing very low coercivity, high permeability magnetic elements. These implementations detected harmonics of a superimposed low amplitude alternating interrogation field. However all the configurations described in the previous applications may also be operated with the baseband signals generated by the passage of the tag through the magnetic null, without the need for any superimposed alternating interrogation field. If required a null-scanning field may be added to permit stationary tags to be read.

Moreover, the basic technique described is not restricted to low coercivity material, and the present application is concerned with a detector which is capable of interrogating tags containing elements made from magnetic material with coercivity ranging from very low (1 A/m or less) up to high (30,000 A/m or more). This type of embodiment is particularly efficient for high coercivity material because it avoids the need for the high amplitude a.c. interrogation field which would otherwise be required for such material. Other advantages include a high data rate, and simplicity. The invention is particularly suitable for extracting information from items such as security documents and banknotes which already contain magnetic elements made from material having a wide range of coercivities. It will thus be appreciated that the term "tag" as used herein encompasses within its scope items such as security documents and banknotes.

U.S. Pat. No. 3,964,042 (D1—Garrott) describes a metal detector for detecting ferrous objects such as nuts and bolts, particularly in the context of forage harvesting machines, where it is apparently common for machine parts made of iron or other magnetic materials to break away and cause damage to the forage processing parts of the machine. The metal detector utilises permanent magnets to generate a static magnetic field, the magnets being arranged so that the lines of magnetic force extend between poles of opposite polarity in a first plane which will be intersected by the passage of extraneous metal objects into the machine. A detecting coil is arranged around the permanent magnets in a second plane which is perpendicular to said first plane. As illustrated, the coil is positioned in a horizontal plane. The coil is therefore sensitive to flux changes occurring within a vertical plane (i.e. perpendicular to that of the coil). In the illustrated embodiment, four magnetic poles are arranged in the configuration:

$$----N_1---S_2--- \qquad ----S_1---N_2---$$

This is achieved by using two magnets of generally horseshoe cross section placed in contact side by side. There are thus two magnetic discontinuities, both occurring in the vertical plane which passes through the contact plane between the two magnets. Such an arrangement cannot detect the passage of a magnetic element having an axis of easy magnetisation through the magnetic null (which lies in a vertical plane with the geometry of FIGS. 2 and 3 of D1). This is because the coil arrangement employed in D1 is sensitive to flux changes in the vertical direction, but insensitive to changes in the horizontal direction. In contrast, if a magnetic tag were to move through the magnetic arrangement in the direction of the arrow shown in FIG. 2 of D1, there would be no change of magnetic flux in the vertical direction, whereas there would be a change of flux in the direction of motion (i.e. in a horizontal plane). Further, column 6, lines 1 to 29 of D1 make it clear that if a small symmetrical metal object were to pass through the magnetic null, it is unlikely to be detected.

EP-A-0 295 085 (D2—Scientific Generics Ltd) describes a method of detecting the presence of articles by applying to them preselected magnetic tags, these being arranged in a coded formation so that magnetic interrogation can be used to determine the presence of the article. There is no disclosure of the use of an interrogating field such as is used in the present application.

U.S. Pat. No. 5,397,985 (D3—W. David Kennedy) discloses a method of electromagnetic imaging of a conductive casing in which a transducer is introduced inside the casing and is moved along the length of the casing while being rotated. Measurements of flux density variation are made.

GB-A-2 071 336 (Doduco) discloses a position encoder which employs a bistable magnetic element positioned between two permanent magnets. The bistable magnetic element has wound around it an exciter coil which transmits an AC field and a detector coil.

According to the present invention, there is provided a detector for sensing the presence of a magnetic tag having an axis of easy magnetisation, which comprises (1) either (i) a magnet or (ii) a pair of magnets arranged in magnetic opposition, the magnet or magnets being disposed so as to define a spatial region through or across which the magnetic tag is, in use, passed, the disposition of said magnet(s) and the resultant magnetic field pattern being such as to cause a change in polarity of the magnetisation of said magnetic tag in the course of its passage through a magnetic null within said spatial region; and (2) a receiver coil or coils positioned above and in proximity to one pole of said magnet (where a single magnet is employed), or positioned between said pair of magnets (where two magnets are employed), and arranged to detect magnetic dipole radiation emitted by a magnetic tag as it passes through said magnetic null with the easy axis of magnetisation of the tag oriented in the direction of travel.

In one embodiment, the detector comprises a pair of permanent magnets arranged in magnetic opposition, i.e. with like poles directed towards one another, the space between the magnets defining said spatial region and being in the form of a slot through which the magnetic tag, in use, is passed. In another embodiment, the detector comprises a single permanent magnet, said spatial region being constituted by a region of space above one surface of the magnet, and the magnetic tag, in use, being passed over said surface of the magnet in proximity thereto.

As will be described below, it is particularly advantageous for the receiver coils to be fabricated as an assembly of printed circuit boards, the coil windings being constituted by conductive paths on the boards, and the boards being interconnected to generate a three dimensional coil.

We will now describe an arrangement which is particularly applicable to the non-contact reading of information from moving tags or elements containing medium or high coercivity material. This arrangement is also appropriate for situations where the field required to saturate the tag material is high, independent of coercivity (e.g. where the tag elements have poor shape factor, and thus, because of demagnetisation effects, low permeability). The arrangement employs a magnetic null created by one or more strong permanent magnets. The strength of the magnet(s) is selected so that the peak fields in the regions immediately adjacent to the narrow centre-point null region are sufficient to saturate the tag material. Clearly, for high coercivity tag materials, this will require powerful magnets. Such components, typically made from alloys containing rare earth elements such as samarium and cobalt, are routinely available commercially from a variety of manufacturers.

When a moving tag or item containing one or more elements of magnetic material arranged with its or their magnetically soft axis or axes (i.e. an axis of easy magnetisation) oriented in the direction of travel passes through the null region, the magnetisation of the magnetic material changes polarity. This magnetisation change causes a pulse of magnetic dipole radiation from the tag, and this radiation can readily be detected by a suitably positioned receiver coil. In this implementation, with a static null plane and a moving tag, then because the amplitude of the signal induced in the receiver coil is related to the rate of change of magnetisation in the magnetic element, signal amplitude will be related to tag speed.

For a better understanding of the invention, and to show how the same may be carried into effect, reference will now be made, by way of example, to the accompanying drawings, in which:

FIGS. 1a–c illustrates the magnetic behaviour on which the detectors of this invention are based;

Figure 5:
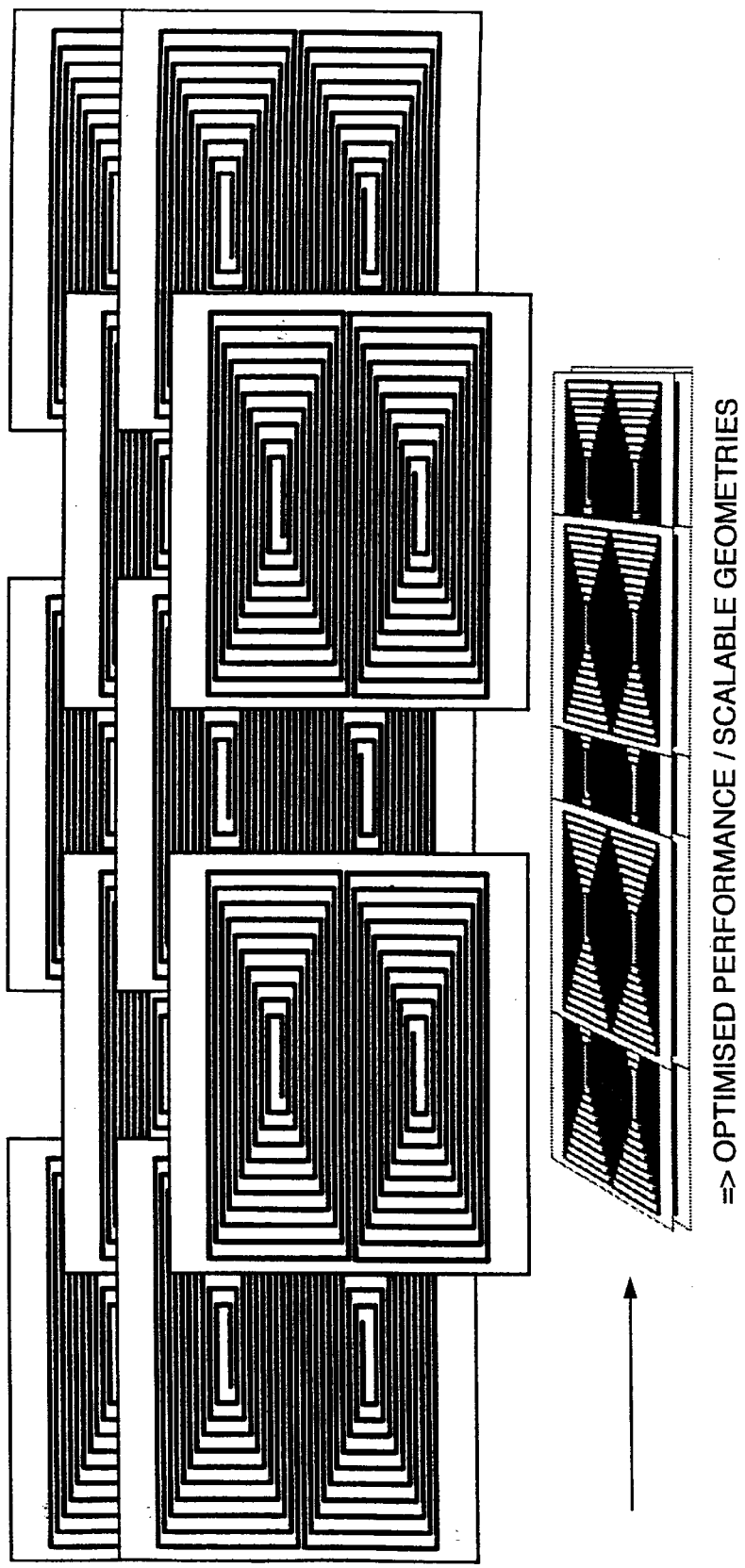
Figure 6:
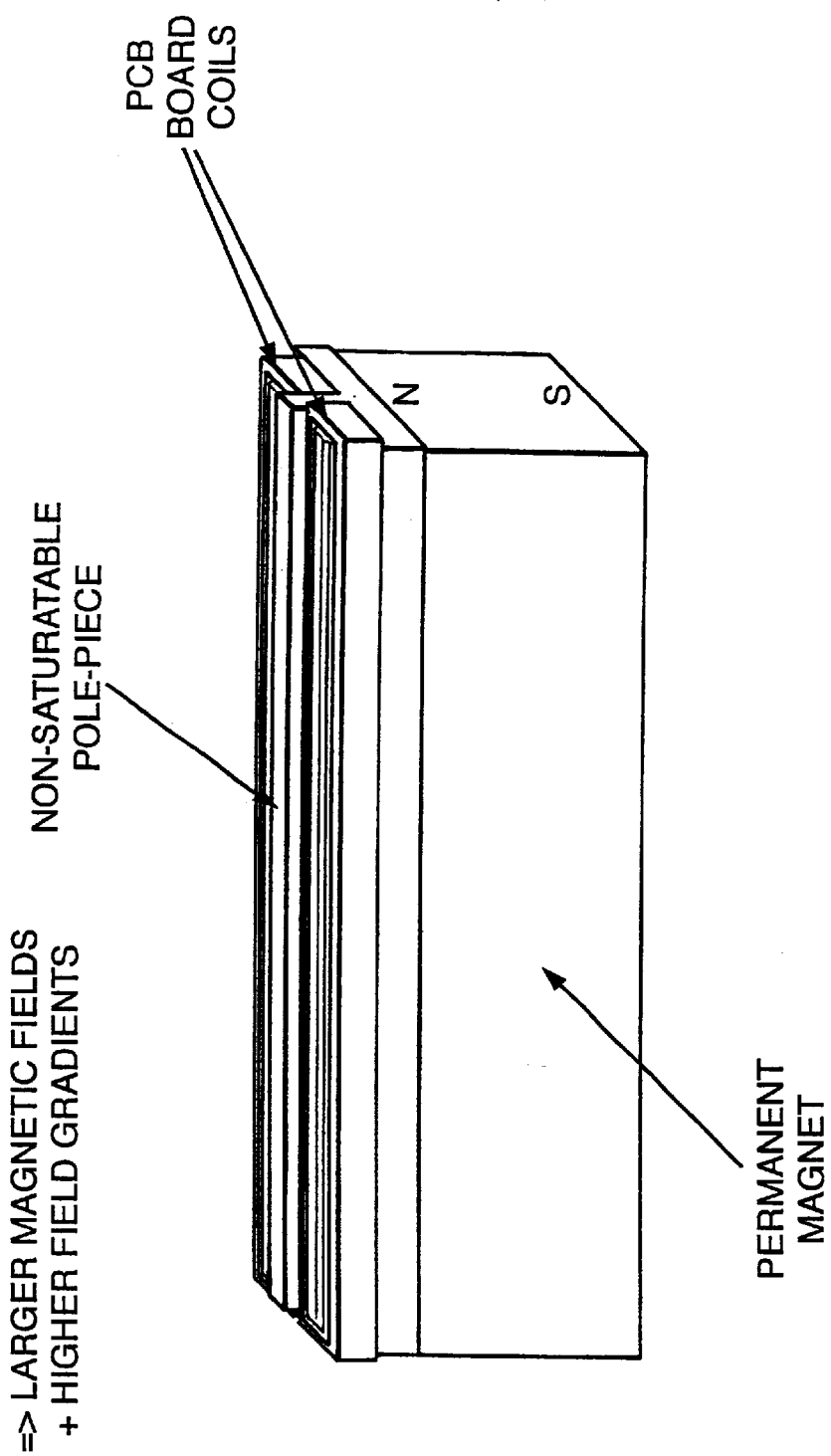

FIGS. 4a–b shows a preferred method for constructing a receiver coil for use in the invention;

FIG. 5 shows, diagrammatically, one advantageous coil geometry for use in the invention; and FIG. 6 shows a coil and magnet configuration for use in the invention.

Figure 1A:
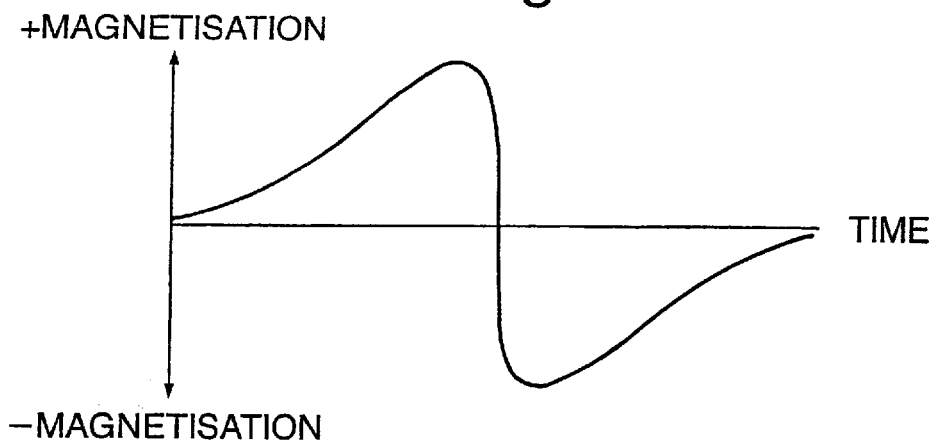
Figure 1B:
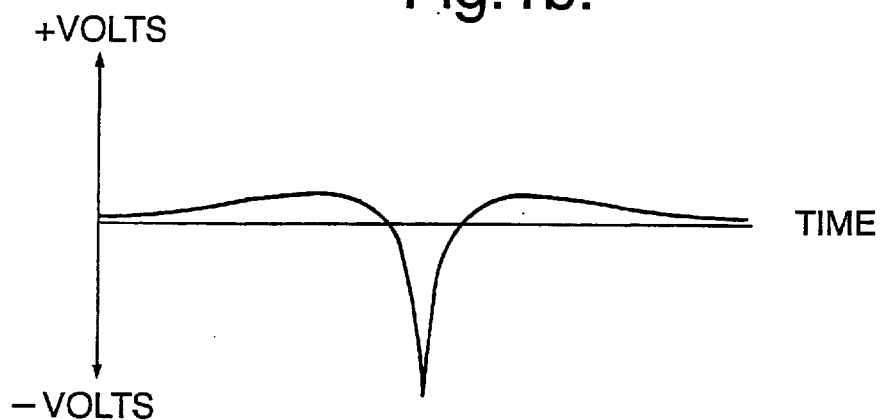

Referring now to the drawings, FIGS. 1(a) and 1(b) show how the magnetisation of a magnetic element changes as it passes through the null region of the interrogator, and the form of the signal induced in the receiver coil. The magnetic null corresponds to the region of space over which the magnetic element is not in saturation. This is illustrated in FIG. 1(a), for the condition where the length of the tag is less than or equal to the width of the magnetic null. FIG. 1(b) indicates the voltage induced in the receiver coil when the tag element length is comparable with the null width (as in FIG. 1(a)). For longer tag elements, different parts of the tag element will be moved into and out of the null region for the time that the tag element straddles the null region. The duration of the induced pulse will therefore be extended, as indicated diagrammatically in 1(c).

Figure 2:
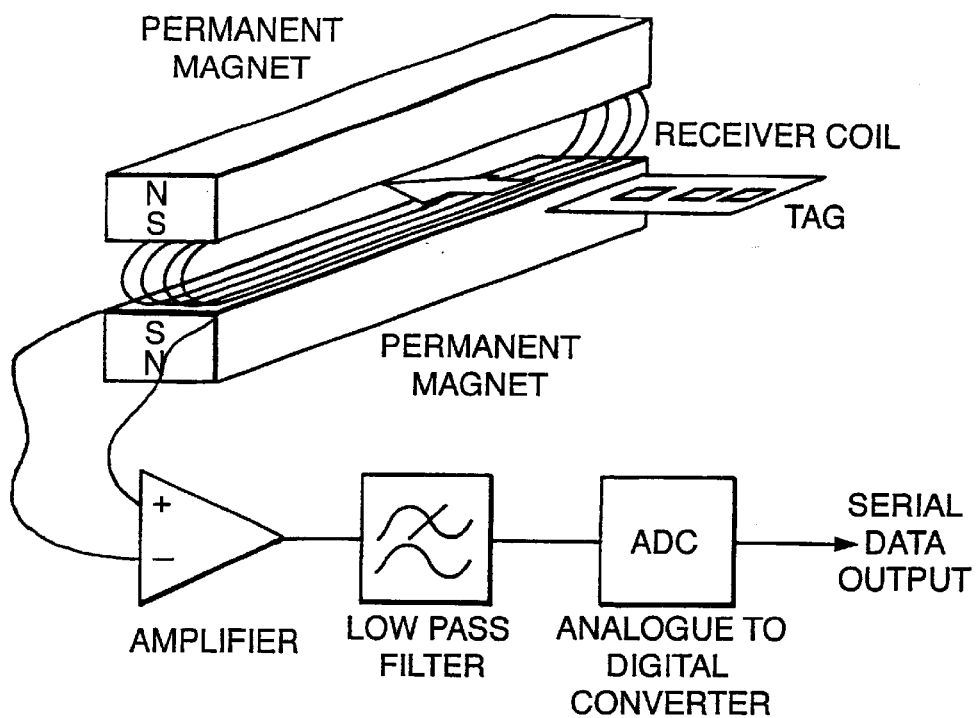
FIG. 2 illustrates a first embodiment of the invention.

FIG. 2 shows one embodiment of the invention which takes the form of a slot reader. In this implementation a simple receiver coil configuration is shown for clarity. This coil configuration is satisfactory for benign environments, particularly when the coil area is small. However, in environments where there are significant external magnetic noise sources present (e.g. if the reader is part of a machine containing unshielded electric motors), or the coil area is large, a more complex receiver coil comprising two co-axial anti-phase series-connected coils is preferable. The outer coil of this arrangement has fewer turns than the inner coil so as to give an equal but opposed dipole moment (area x turns product). This arrangement has low sensitivity to on-axis external far-field signals, but retains good sensitivity to tag elements at the centre of the coil pair. It is therefore less affected by interference than the simple single coil.

As shown, the two magnets which define the "slot" are in magnetic opposition—with (in this case) south poles directed towards each other. Elementary magnetic theory shows that the lines of force will be compressed in the regions immediately adjacent each south pole, and that there will be a null region located within the volume between the two magnets. As the magnetic element approaches the slot in the direction of the arrow, with its axis of easy magnetisation aligned in the direction of travel, it will become magnetised in the direction of travel as a result of experiencing the component of the field in the direction of travel (which is in a horizontal plane as seen in FIG. 2). Elementary magnetic theory indicates that this component field increases to a maximum on approach towards the slot, then decreases to zero at the magnetic null within the slot. As the tag continues its travel through the slot, it again experiences a component of the magnetic field in the direction of travel, but this time the direction of that component is reversed in comparison to the component field experienced when the tag was approaching the slot. Hence the polarisation of the tag's magnetisation has been reversed on passage through the magnetic null. This magnetisation reversal results in the emission of magnetic dipole radiation, which is detected by the coil.

Figure 3:
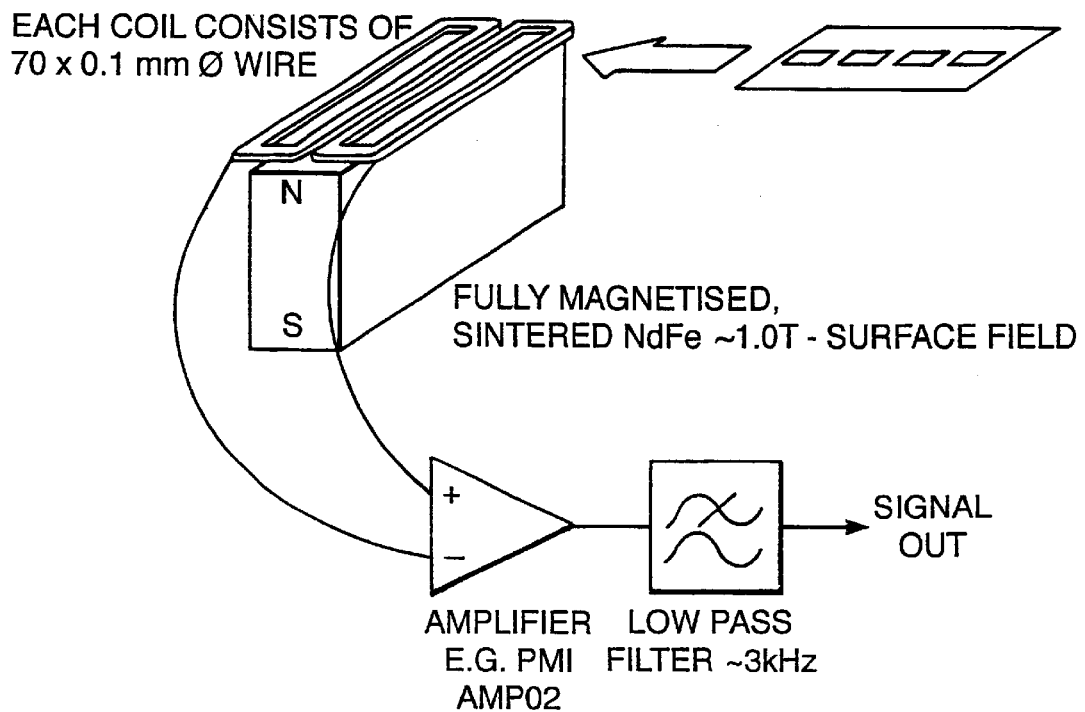
FIG. 3 illustrates a second embodiment of the invention.

FIG. 3 illustrates a second embodiment of the invention which takes the form of a single-sided reader, the reader being suitable for reading magnetic elements down to about 1 mm in length with coercivities up to about 500 oersted. The sensitivity of the reader is approximately uniform over a range of 0 –1 mm from the surface of the coils, the maximum useable range being around 2 mm. In this embodiment the static magnetic fields are created by a fully-saturated sintered NdFe permanent magnet with dimensions; 15 mm long×5 mm wide×10 mm thick and a surface field of c. 1.0 Tesla. As explained above in relation to FIG. 2, a consideration of the lines of force generated by the high-power magnet will show how the magnetic element(s) in the tag or item are first magnetised in one polarisation, and then in the opposite sense as they pass over the surface of the magnet. At the mid-point of the travel of the tag over the magnet, the horizontal field is zero—i.e. the magnetic element(s) experience(s) a magnetic null. The overall receiver coil is made from two anti-phase connected coils, i.e. as a figure-of-8 configuration. Each coil is wound on a former 1.6 mm wide×10 mm long, and contains 70 pile-wound turns of 0.1 mm diameter enamelled copper wire. This configuration provides good coupling to the magnetic dipole radiation from the tags, and also provides a rapid fall-off in sensitivity with distance from the coil. Such a sensitivity profile is desirable for operation in environments where significant external magnetic noise sources may be present (e.g. if the reader is part of a machine containing unshielded electric motors). The low-level output from the receiver coil is amplified×1000 in a low-noise instrumentation amplifier, a device such as the Analogue Devices AMP-027 integrated circuit being suitable. The bandwidth of the system is defined by a low pass filter, implemented using well-known techniques based on low-cost operational amplifiers e.g. type TL084. The optimum signal-to-noise ratio is provided when the filter bandwidth matches the maximum signal bandwidth. For tags with magnetic elements of minimum length 1 mm, moving at speeds of 10 m/sec, a bandwidth of 5 Khz is appropriate.

Figure 1C:
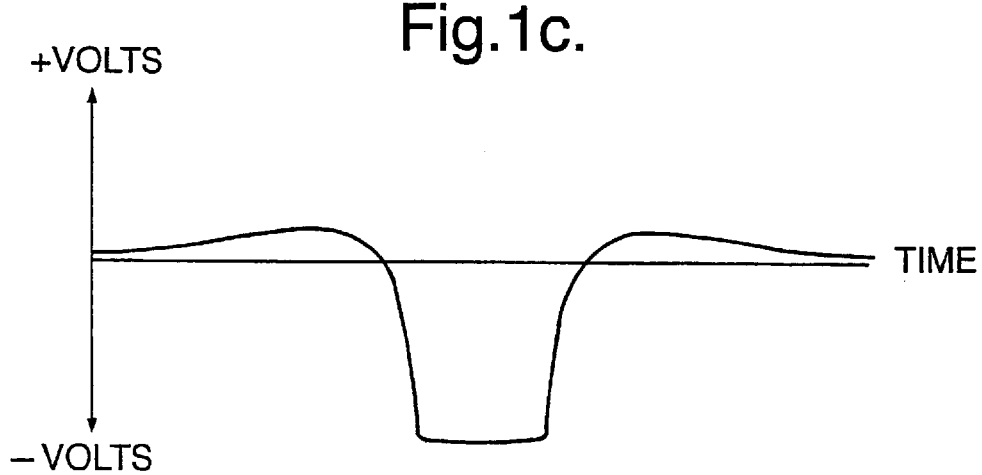

The tag illustrated in FIG. 2 is shown with three magnetic elements; that of FIG. 3 with four magnetic elements. It will be appreciated, from a consideration of FIGS. 1(a) to 1(c), that the devices of FIGS. 2 and 3 will read these tags, giving signals WHICH correspond in number to the number of magnetic elements present in the tag, and whose characteristics are dependent upon the length of the magnetic elements (compare FIGS. 1(b) and 1(c)). The devices thus function as readers for the tags.

It is important with the configurations just described to ensure that the structure has adequate mechanical stability, to avoid induced voltage due to movement of the coil(s) relative to the magnets. Relevant techniques are those already used in industrial metal detectors, such as, for example: means to prevent tags coming into direct contact with the receiver coil(s), solid bonding of coils and magnets into the support structure and isolation of this structure from external vibration.

The effectiveness of the embodiments described above may be increased by attention to specific areas of their construction. These relate to the geometry and fabrication of the coils; the interleaving of multiple coils in multi-channel designs; and the arrangement of the permanent magnet with respect to the coils. All of these provide enhanced performance in the detection process. In particular, the performance of FN (flying null) heads for detection of the relevant magnetic materials is limited by four factors, namely:

1) The receive coil sensitivity—as determined by the number of turns in the coil forming the antenna (which defines the signal picked up) versus the electrical resistance of the coil (which sets the internal noise generated by the coil);.

2) The insensitivity of the coil to far-field (ambient) electromagnetic noise sources, this requiring a balanced antennae geometry (a quadrupole or higher order response);

3) The strength of the magnetic field in the regions contiguous with the null region, and its gradient through the null; and 4) The structural rigidity of the antenna with respect to the bias-field magnet.

Design features based upon these considerations will now be described.

A particularly advantageous arrangement comes from the use of a multi-layer printed circuit board or "PCB" (as commonly used for implementing electronic circuits), to construct the coils required in FN heads. The patterns on such circuits are lithographically generated, allowing very precise coil geometries to be achieved and readily reproduced in volume manufacture. This form of construction allows very precise 'coil winding', and the production of a variety of specialised antennae can be envisaged which exploit the precise three dimensional tolerances that are achievable in multi-layer lithographic PCB production. The coil formation is realised in using particular geometries of tracks on each layer and subsequently connecting these using standard through-layer interconnection methods. In addition, scaling coils for different applications becomes very simple, and coil structures that would be difficult to achieve by conventional coil winding techniques becomes relatively straightforward.

Figure 4:
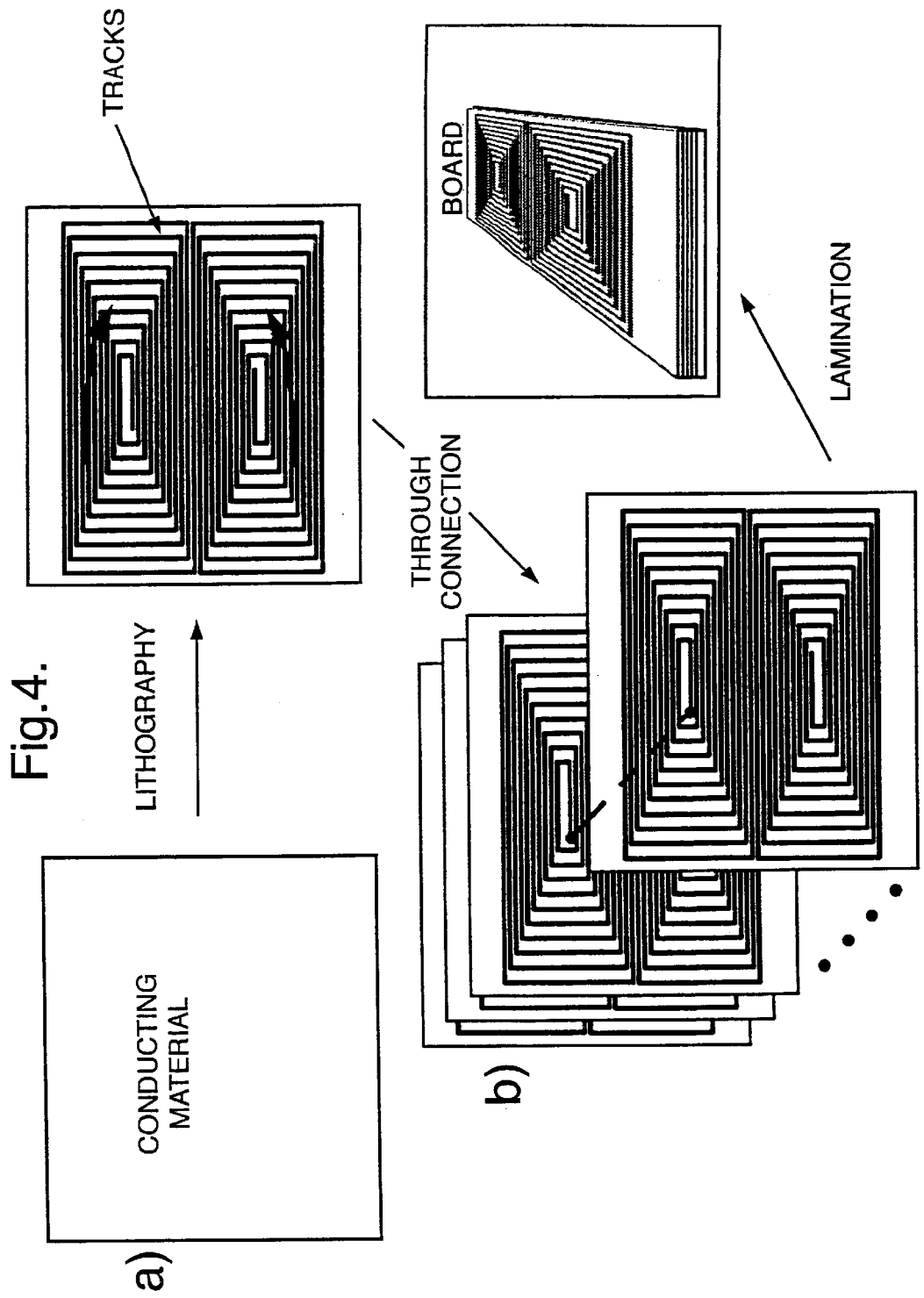

FIG. 4 is an example of the technique. This shows the important physical parameters of one particular implementation of the scheme. In FIG. 4a, we can see the basic concept of the delineation of metallic tracks (the equivalent of the wire in a conventional coil) as realised using lithographic means. These tracks are then interconnected to create a three dimensional coil, with the tracks on each layer forming the windings (FIG. 4b). In practice we have implemented coils employing over 20 PCB layers.

Overlapping geometries can have advantages in particular applications. For example, a single balanced coil arrangement is unsuitable for detection over large areas because it becomes excessively sensitive to external interference. Covering the desired area with a number of smaller coils having overlapping detection regions overcomes this problem). FIG. 5 shows one way in which this can be achieved, with coil patterns etched onto different layers of a multi-layer board.

PCB construction is also inherently rigid, and this is beneficial in preventing movement of the coil windings with respect to the magnet. Any such movement, caused for example by accidental impacts on the head, would generate unwanted noise voltages in the coil, thus degrading performance.

A further design improvement is to extend the surface of the permanent magnet up through the centre of the coils. This increases the field strength and gradient field in the region of interest, and provides increased resolution or signal level, or both, compared to a design where the magnet surface is beneath the level of the coils. An implementation using a magnet with an extended pole piece is illustrated in FIG. 6. This uses PCB coils, but could also be implemented with conventionally-wound coils.

What is claimed is:

1. A detector for sensing the presence of a magnetic tag having an easy axis of magnetization, which detector comprises:

at least one magnet disposed so as to define a spatial region through which the magnetic tag is, in use, passed, wherein the resultant magnetic field pattern comprises a first region at which the component of the magnetic field resolved in a first direction is zero, and where in regions contiguous with said first region, the component of the magnetic field resolved in said first direction is sufficient to saturate the, or a part of the, magnetic tag, and wherein the disposition of said magnet and the resultant magnetic field pattern is such as to cause a change in polarity of the magnetization of said magnetic tag in the course of its passage through said spatial region; and at least one pair of receiver coils connected in antiphase arrangement, the coils being positioned above and in proximity to one pole of said magnet and arranged to detect magnetic dipole radiation emitted by a magnetic tag as it passes through said magnetic field pattern with the easy axis of magnetization of the tag oriented in the direction of travel.

2. A detector as claimed in claim 1, which comprises a pair of permanent magnets arranged in magnetic opposition, the space between the magnets defining said spatial region and being in the form of a slot through which the magnetic tag, in use, is passed.

3. A detector as claimed in claim 1, which comprises a single permanent magnet, said spatial region being constituted by a region of space above one surface of the magnet, and the magnetic tag, in use, being passed over said surface of the magnet in the proximity thereto.

4. A detector as claimed in claim 1, wherein said detector includes a plurality of interconnected coils arranged in a geometrically overlapping configuration.

5. A detector as claimed in claim 1, wherein said detector includes coils in the form of an assembly of printed circuit boards, the coil windings being constituted by conductive paths on the boards, and the boards being interconnected to generate a three dimensional coil.

6. A detector as claimed in claim 1, wherein said magnet includes a pole piece which extends in close proximity to the windings of said receiver coil.

7. A detector as claimed in claim 1, which further comprises signal processing means connected to said receiver coil.

8. A detector as claimed in claim 7, wherein said signal processing means is configured and arranged to generate an output signal which corresponds to or correlates with information stored in said magnetic tag.

9. A detector as claimed in claim 8, wherein said signal processing means comprises a low-noise instrumentation amplifier whose inputs are connected to the receiver coil and whose output is connected to a low pass filter.

10. A banknote reader comprising a detector as claimed in claim 1, and wherein said magnetic tag is in the format of a banknote.

11. A detector for sensing the presence of a magnetic tag having an axis of easy magnetization, which comprises (1) a magnet disposed so as to define a spatial region through which the magnetic tag is, in use, passed, wherein the resultant magnetic field pattern comprises a first region at which the component of the magnetic field resolved in a first direction is zero, and where in regions contiguous with said first region, the component of the magnetic field resolved in said first direction is sufficient to saturate the, or a part of the magnetic tag, and wherein the disposition of said magnet(s) and the resultant magnetic field pattern being such as to cause a change in polarity of the magnetization of said magnetic tag in the course of its passage through said magnetic field pattern within said spatial region; (2) receiver coils comprising at least one pair of coils connected in antiphase arrangement, the coils being positioned above and in proximity to one pole of said magnet and arranged to detect magnetic dipole radiation emitted by a magnetic tag as it passes through said magnetic null with the easy axis of magnetization of the tag oriented in the direction of travel; and (3) signal processing means configured and arranged to generate an output signal which corresponds to or correlates with information stored in said magnetic tag.

12. A detector for sensing the presence of a magnetic tag having an axis of easy magnetization, which comprises (1) a pair of magnets arranged in magnetic opposition, the magnets being disposed so as to define a spatial region through which the magnetic tag is, in use, passed, wherein the resultant magnetic field pattern comprises a first region at which the component of the magnetic field resolved in a first direction is zero, and where in regions contiguous with said first region the component of the magnetic field resolved in said first direction is sufficient to saturate the, or a part of the, magnetic tag, and wherein the disposition of said magnets and the resultant magnetic field pattern being such as to cause a change in polarity of the magnetization of said magnetic tag in the course of its passage through said magnetic field pattern within said spatial region; (2) receiver coils comprising at least one pair of coils connected in antiphase arrangement, the coils being positioned between said pair of magnets and arranged to detect magnetic dipole radiation emitted by a magnetic tag as it passes through said magnetic null with the easy axis of magnetization of the tag oriented in the direction of travel; and (3) signal processing means configured and arranged to generate an output signal which corresponds to or correlates with information stored in said magnetic tag.

13. A method for sensing the presence of a magnetic tag bearing magnetizable material comprising the steps of:

mounting at least one magnet to define a spatial path which produces a change in polarity in magnetizable material moving along said path;

moving a magnetic tag along said path so that the magnetization of said tag changes in polarity, and concurrently produces dipole radiation; and providing a pair of coils connected in antiphase relationship positioned above and in proximity to at least one pole of said magnet to detect magnetic dipole radiation emitted by said tag as it changes in polarity.

14. A method as defined in claim 13 wherein said mounting step includes mounting two permanent magnets in magnetic opposition.

15. A method as defined in claim 13 wherein said mounting step includes mounting a single permanent magnet to provide said spatial path.

16. A method as defined in claim 13 including providing two coils in an antiphase arrangement.

17. A method as defined in claim 13 including the additional step of electrically processing signals picked up by said coil.

18. A method as defined in claim 17 including amplifying said signals and passing said signals through a low pass filter.

19. A detector for sensing the presence of a magnetic tag having an axis of easy magnetization, which detector comprises:

a magnetic tag having an axis of easy magnetization;

at least one magnet disposed so as to define a spatial region through which the magnetic tag is, in use, passed, wherein the resultant magnetic field pattern comprises a first region at which the component of the magnetic field resolved in a first direction is zero, and where in regions contiguous with said first region, the component of the magnetic field resolved in said first direction is sufficient to saturate the, or a part of the, magnetic tag, and wherein the disposition of said magnet and the resultant magnetic field pattern being such as to cause a change in polarity of the magnetization of said magnetic tag in the course of its passage through said magnetic field pattern within said spatial region; and at least one pair of receiver coils connected in antiphase arrangement, the coils being positioned above and in proximity to one pole of said magnet and arranged to detect magnetic dipole radiation emitted by a magnetic tag as it passes through said magnetic field pattern with the easy axis of magnetization of the tag oriented in the direction of travel.

* * * * *